United States Patent [19]
Ogawa

[11] Patent Number: 5,561,543
[45] Date of Patent: Oct. 1, 1996

[54] INFORMATION INPUT SYSTEM BY ATTITUDE DETECTION OF MANUAL IMPLEMENT

[75] Inventor: Yasuji Ogawa, Otone-machi, Japan

[73] Assignee: Kabushikikaisha Wacom, Japan

[21] Appl. No.: 432,930

[22] Filed: May 1, 1995

[30]     Foreign Application Priority Data

May 2, 1994  [JP]  Japan .................................. 6-116025

[51] Int. Cl.⁶ ...................................................... H04B 10/00
[52] U.S. Cl. ............................ 359/147; 359/143; 359/159; 348/734
[58] Field of Search .................................... 359/142, 143, 359/144, 146, 147, 159; 348/734; 345/156–158; 358/194.1

[56]              References Cited

U.S. PATENT DOCUMENTS 5,045,843  9/1991  Hansen ..................................... 359/142
5,359,348  10/1994  Pilcher et al. ......................... 359/147
5,448,261  9/1995  Koike et al. ............................. 348/734

FOREIGN PATENT DOCUMENTS 6-59807   3/1994   Japan .

*Primary Examiner*—Leo Boudreau
*Assistant Examiner*—Kinfe-Michael Negash

*Attorney, Agent, or Firm*—Adams & Wilks

[57]                ABSTRACT

An information input system inputs pointing information by a slight movement of an input implement held in an operator's hand. The information input system is a combination of an input implement 11 which is manually operated relative to a predetermined reference point to change an attitude thereof, and a detector for optically detecting the attitude of the input implement 11 using light as a detecting medium, in which information according to the manual operation is input to a television set 1 by utilizing the above attitude detection. At the reference point on the television set 1, a light emitting diode 6 is arranged to emit incident light 7 toward the input, implement 11. On the other hand, the detector is provided with an image forming portion, a light-receiving portion and a processing portion, and is integratedly incorporated into the input implement 11 so as to receive the incident light 7 emitted from the light emitting diode 6. The image forming portion converts the incident light 7 emitted from the light emitting diode 6 into a spot image or a pattern image to be projected on the light-receiving portion. The light-receiving portion then outputs electric signals according to positions of the spot image or the pattern image corresponding to the attitude of the input implement 11. The processing portion finally processes the electric signals to extract the attitude of the input implement 11, and transmits the extracted attitude to the television set 1 as input information. This transmission uses modulated infrared-light 10 as a medium.

11 Claims, 4 Drawing Sheets

INFORMATION INPUT SYSTEM BY ATTITUDE DETECTION OF MANUAL IMPLEMENT

BACKGROUND OF THE INVENTION

1. Field of the Invention

The present invention relates to an information input system for operating a machine using an input implement held in operator's hand, such as for example, an infrared remote controller for a television set, or to an information input system utilized for a menu operation or inputting operation of graphic or handwritten characters to a game instrument having a display or a personal computer. Further, it relates to an information input system suitable for control or manipulation of objects on the display.

2. Related Background Art

There has been used an infrared remote controller for control of a television set as a typical information input device, which emits modulated infrared-light coded according to input information by pushing a plurality of button switches provided on the controller. In such an information input system, machine operation or control can be performed according to the input information by receiving the above modulated infrared-light in an infrared-light detection unit attached to the television set and by decoding it.

However, in the above, conventional infrared remote controller, when adjusting an analog amount of sound volume or the like, the user must keep pushing the button switch until an optimum sound volume is obtained. This has caused a problem of poor operability. Also, if the television set incorporates a graphic user interface, such as a multimedia terminal, then it needs to input pointing information for menu operation and other interactive operations. In this case, a cruciform cursor key has been used for shifting of a cursor on the screen in general; however, this has caused the problem of bad workability as well.

Recently, there has been proposed a system structure adding a track ball to the controller as a pointing means instead of the cruciform cursor key for special uses such as video control and the like. With such a system structure, however, there have remained still other problems such as that the track ball is relatively expensive and does not work well.

There has been also proposed another type of cursor control system which inputs the pointing information using a light medium, for example, as disclosed in Japanese Patent Publication No. Hei 6-59807. In this system, a light source is built in the input implement for indication of its own position, and an image pickup element is provided on a machine side, so that the incident ray of light from the light source is received to detect the position of the input implement, whereby the cursor on the display is shifted. If the input implement is located close to the machine body, then the cursor will respond to relatively slight movement of the input implement.

However, as the distance between the input implement and the machine body becomes longer, the moving range of the input implement has to be made wider for scanning the cursor at will on the display. Accordingly, the above system also suffers from the problem that the workability of the input implement worsens as the input implement moves away from the machine body.

Furthermore, as the input implement moves away, the amount of light received by the image pickup element provided on the machine side is reduced and the noise of external light becomes relatively great. For this reason, there has arisen yet other problems such as that incorrect information could be input.

SUMMARY OF THE INVENTION

In view of the above noted conventional problems, an object of the present invention is to provide an information input system which makes it possible to input pointing information or analog amount information by relatively slight movement of an input implement.

Also, another object of the present invention is to provide an information input system which makes it possible to input the information by wireless remote without the influence of external light even when the distance between a machine and an input implement is far.

In order to accomplish the above objects, according to the present invention, there is provided an information input system which includes the combination of an input implement and a detector as a basic structure. The input implement is manually operated relative to a predetermined reference point to change its attitude. The detector optically detects the attitude of the input implement using light as a sensing medium. The information input system then inputs information according to the manual operation of the input implement to the machine by utilizing the detected attitude.

The present invention further comprises at least one light source provided at the reference point which emits incident light toward the input implement. On the other hand, the detector is provided with an image formation means, at least one light-receiving means and processing means. The detector is integrated into the input implement so as to receive the incident light emitted from the light source.

The image formation means converts the incident ray of light emitted from the light source into one of a spot image or a pattern image to be projected on the light-receiving means. The light-receiving means then outputs an electric signal according to the light-receiving position of the spot image or the pattern image corresponding to the attitude of the input implement. The processing means finally processes the electric signal to extract the attitude of the input implement and transmits it to the machine as input information.

In addition to the above structure, the input implement further includes light-flashing means for remotely controlling on-and-off operation of the light source arranged at the reference point. Then, the processing means that is included in the detector incorporated in the input implement reads out the electric signals from the light-receiving means in synchronism with the on-and-off operation of the light source, and extracts the attitude of the input implement based on a difference between the synchronously read electric signals, so that the influence of disturbing light can be eliminated.

In one specific form of the present invention, the input implement is constituted as a wireless type input implement provided with a transmitter for transmission of the infrared light. The detector incorporated in the input implement includes transmission means in which the infrared light is modulated based on the extracted attitude of the input implement and is then directed toward the machine, thus carrying out the wireless transmission of the input information. The above system structure can be applied, for example, to the remote control of the television set or television receptor constituting a machine.

In this case, an operator first directs the input implement toward the light source located at the reference point and then changes the attitude of the input implement while keeping a button switch on the input implement pushed. At this moment, even if the input implement is far away from the light source, the operator will not need to move the input implement across a wide range, and he or she has only to slightly change the attitude of the input implement by hand.

Differently from the conventional structure, in the above structure according to the present invention, the light source is arranged at the reference position set on the machine side, while the detector is built in the input implement. The image formation means, such as a lens or the like, that is included in the detector converts the incident light emitted from the light source into a spot image to be projected on the light-receiving means. For the light-receiving means, for example, an image sensor, such as CCD or the like, generally incorporated into a TV camera can be used. The spot image then changes its position on the light-receiving surface of the light-receiving means according to the positional relationship between the light source and the detector.

In this condition, when the light-receiving surface is tilted relative to a virtual optical axis between the light source and the detector, then the position of the spot image significantly changes. In other words, the position of the spot image moves as the attitude of the input implement changes. Then, the attitude of the input implement is extracted while the button switch on the input implement is pushed.

As an aside, for the image formation means, a multi-slit plate or the like can be used instead of the lens. In this case, the attitude of the input implement is extracted by utilizing the phenomenon that the position of the pattern image, projected on the light-receiving surface through the multi-slit plate, is greatly changed according to the attitude of the input implement.

The extracted attitude of the input implement is transmitted as the input information to the machine. At this time, modulated infrared-light is used as the transmission medium and this makes it possible to realize a wireless input implement easily.

Further, for removal of disturbing light, the difference between one image data at the time of turning on the light and another image data, at the time of turning off the light, both being output from the image sensor, is used, thereby eliminating the influence of background light which is slow in change.

The on-and-off control of the light source, however, is required to be performed in synchronism with image pickup timing of the image sensor. In consideration of this point, the system according to the present invention transmits an on-and-off control signal to the machine side using the modulated infrared-light as the medium. As a result, the on-and-off control information can be transmitted together with the attitude information to the machine at the same time.

DETAILED DESCRIPTION OF THE PREFERRED EMBODIMENTS

Figure 1:
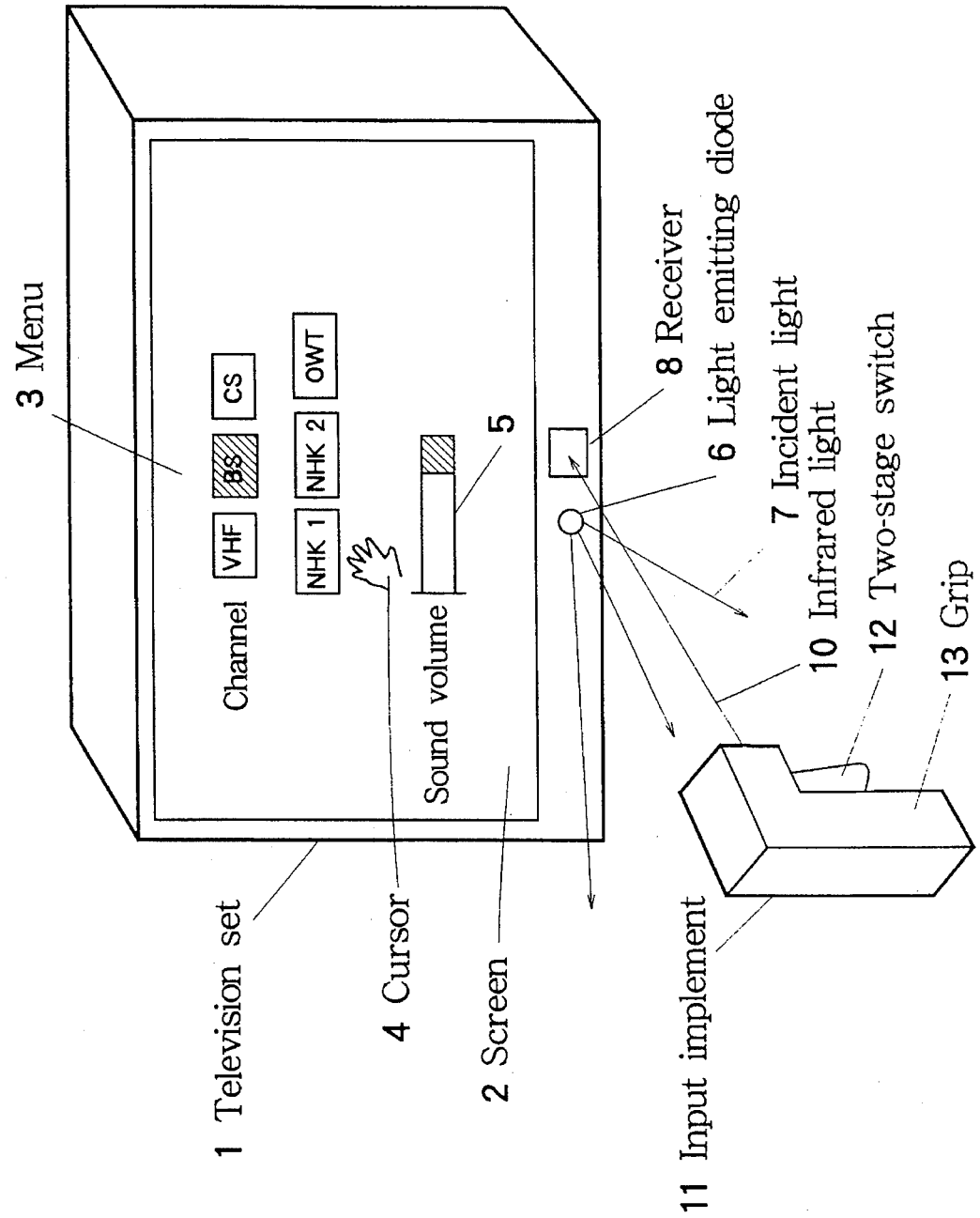
FIG. 1 is a schematic diagram showing an embodiment of an information input system according to the present invention, being applied to remote control of a television receptor.

Referring to drawings, a preferred embodiment of the present invention will be described hereinbelow. FIG. 1 shows an example of an information input system according to the present invention, which is applied to a two-dimensional menu selection in a television set 1. As shown in the figure, the television set is provided with a screen 2 to indicate and display a menu 3, a cursor 4, a sound volume bar 5 and the like. At a reference point set below the screen 2, a light emitting diode 6 is arranged as a light source to emit incident light 7 at a certain wide angle.

In this embodiment, though the reference point at which the light emitting diode 6 is located is set on the television set 1, the present invention is not limited thereto and the diode may be arranged at another reference point set anywhere other than the television set 1. Also, in this embodiment, though only one light emitting diode 6 is used as a light source, the present invention may use two or more light sources. By increasing the number of light sources, the system can deal with additional information, such as distance information and the like, as well as attitude information.

On the other hand, an input implement 11 is manually operated relative to the light emitting diode 6 located at the reference point to change its attitude. The input implement 11 accommodates therein a detector, not shown, so as to optically detect the attitude of the input implement 11 using light as a detecting medium. The information input system of the present invention inputs the information according to the manual operation of the manual implement to the television set 1 utilizing the above attitude detection. The input implement 11 is further provided with a two-stage switch 12 and a grip 13. The two-stage switch 12 is operated by two steps to transmit predetermined switch information to the television set 1.

Figure 2:
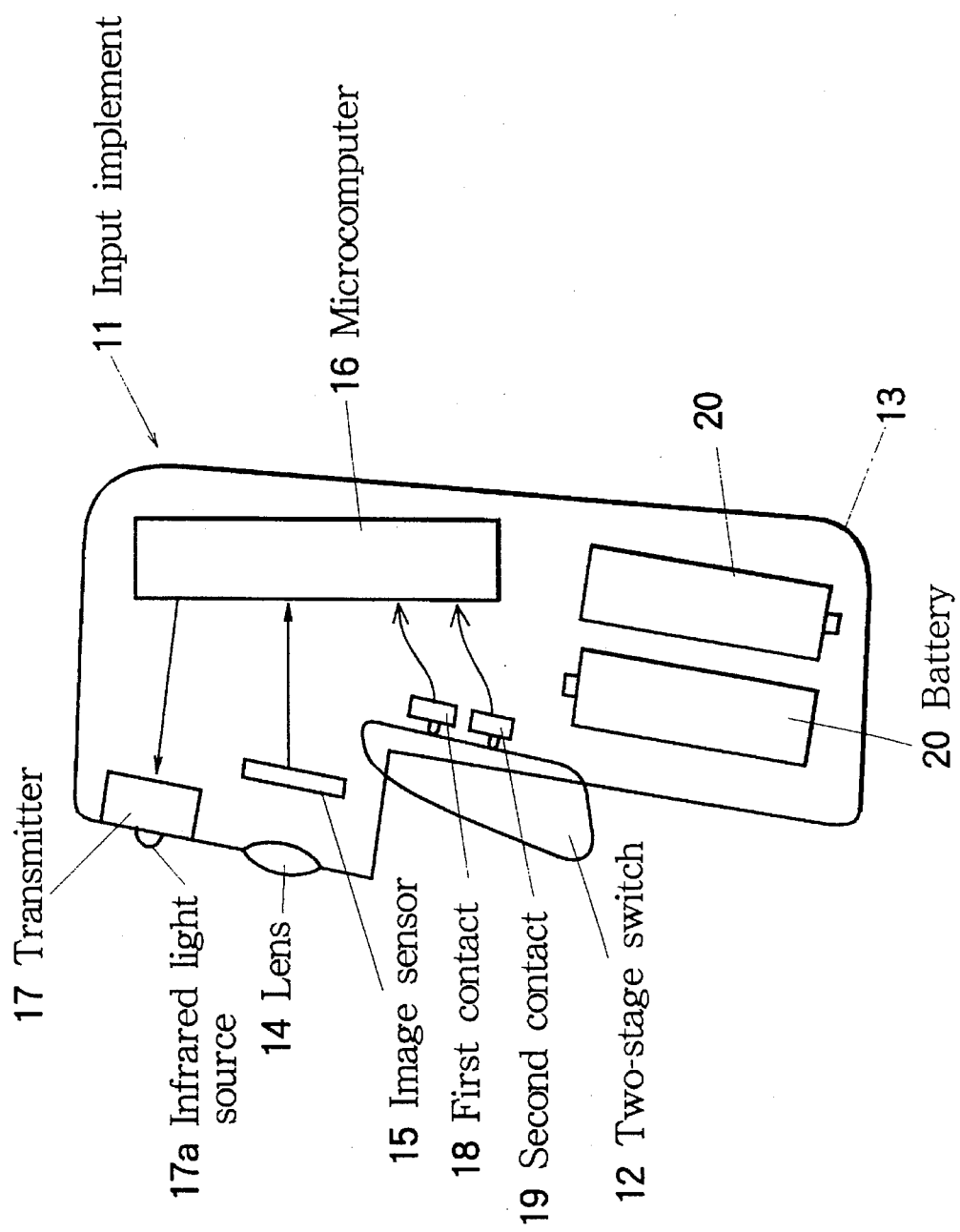
FIG. 2 is a schematic block diagram showing a concrete structure of an input implement used in the system of FIG. 1.

FIG. 2 is a schematic block diagram showing a concrete structure of the input implement 11 shown in FIG. 1. This input implement 11 has the detector therein, as mentioned above, provided with an image formation means, at least one light-receiving means and processing means. The detector is integrated in the input implement 11 so as to receive the incident light 7 emitted from the light emitting diode 6 (FIG. 1).

In this embodiment, the image formation means is constituted with a lens 14, which converts the incident light 7 emitted from the light emitting diode 6 into a spot image to be projected on the light-receiving means. The light-receiving means is constituted with an image sensor 15, such as a CCD or the like, which outputs an electric signal as image data according to the receiving position of the spot image corresponding to the attitude of the input implement 11.

In this condition, when the input implement 11 is tilted relative to a virtual optical axis between the light emitting diode 6 on the television set 1 side and the image sensor 15, then the position of the spot image is moved along the light-receiving surface. That is, the light-receiving position of the spot image is significantly changed two-dimensionally only by tilting the attitude of the input implement 11 slightly, thus easily inputting the information by the manual operation of the input implement 11.

The processing means is then constituted with a microcomputer 16, which processes the image data output from the image sensor 15, extracts the attitude of the input implement 11, and transmits the extracted attitude to the television set 1 as input information.

As an aside, for the image formation means, a multi-slit plate or the like, can be used instead of the lens. In this case, the attitude of the input implement is extracted by utilizing a phenomenon that the position of the pattern image, projected on the light-receiving surface through the multi-slit plate, is changed according to the attitude of the input implement.

In this embodiment, the input implement 11 is constituted as a wireless type input implement provided with a transmitter 17 for transmission of the infrared light 10 (FIG. 1). For this, the transmitter 17 includes an infrared-light source 17a. The microcomputer 16 includes a transmission means constituted by means of software, in which the infrared light 10 (FIG. 1) is modulated by controlling the transmitter 17 based on the extracted attitude of the input implement 11, and is then directed toward a receiver 8 of the television set 1, whereby the wireless transmission of the input information is performed.

The microcomputer 16 further includes a light-flashing means constituted by means of software, in which on-and-off operation of the light emitting diode 6 arranged at the reference point is controlled remotely. Concretely, the microcomputer 16 controls the transmitter 17 to transmit a light turning-on command and a light turning-off command to the television set 1 using the modulated infrared-light as the medium. The microcomputer 16 then reads out the image data from the image sensor 15 in synchronism with the on-and-off operation of the light emitting diode 6 provided on the television set 1, and extracts the attitude of the input implement 11 based on a difference in the image data, thereby eliminating the influence of disturbing light.

The input implement is provided with the two-stage switch 12, as mentioned above, to actuate a first contact 18 and a second contact 19. The on-and-off information of the first contact 18 and the second contact 19 is transmitted from the transmitter 17 through the microcomputer 16 to the television set 1 using the modulated infrared-light as the medium. The first contact 18 is used for switching over the menu display to the regular broadcast program. The second contact 19 is used for commanding the television set to execute the menu selection and set. In addition, batteries 20 are disposed as an electric power source inside the grip 13 of the input implement 11.

Figure 3:
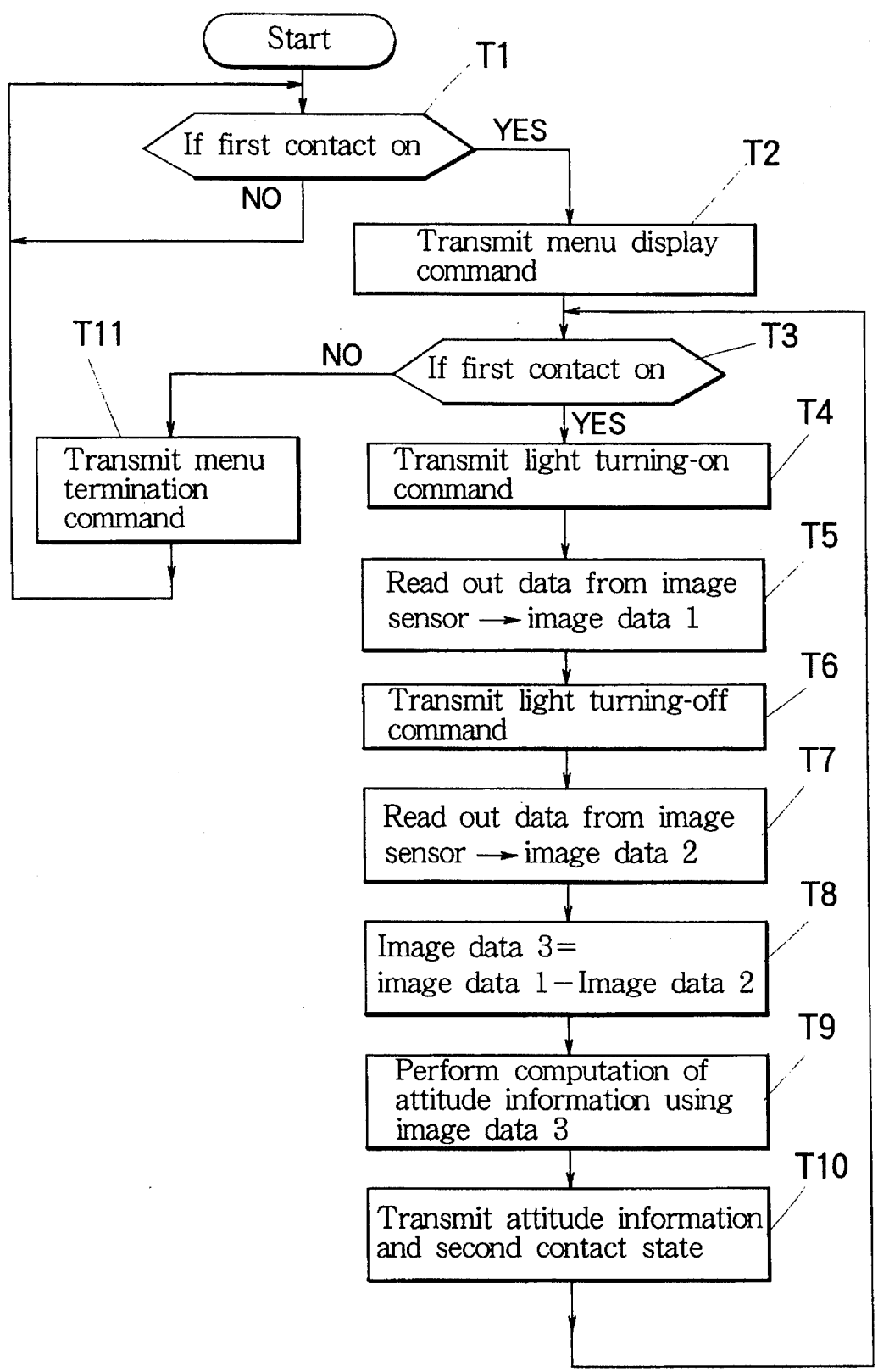
FIG. 3 is a flow chart illustrating an operation of the input implement.

Referring next to FIG. 3, processings of the microcomputer 16 built in the input implement 11 will be described in detail. After start of the input implement 11, it is determined whether the first contact 18 has been turned on at step T1. If the result of determination is negative, the input implement 11 is kept waiting for operation of the first contact 18. On the other hand, if positive, the process goes to step T2, and controls the transmitter 17 to transmit the menu display command through the modulated infrared-light 10 to the television receptor 1.

Next, at step T3, it is confirmed again whether the first contact 18 is still in the on state, and the procedure proceeds to step T4. At this step, the transmitter 17 is controlled to transmit the light turning-on command. The light turning-on command is transmitted automatically by internal timer processing.

Then, at step T5, image data 1 is read out by access to the image sensor 15 in synchronism with the transmission of the light turning-on command, and the procedure goes to step T6. At this step, the light turning-off command is transmitted automatically by the internal timer processing as well. Subsequently at step T7, image data 2 is read out by access to the image sensor 15 in synchronism with the transmission of the light turning-off command. At step T8, image data 3 is obtained from the difference between the image data 1 and 2. As a result, a background or noise component can be removed from the image data and this makes it possible to eliminate the influence of the external light.

Next, an arithmetical operation of the image data 3 is performed at step T9 to extract an attitude of the input implement 11. The extraction of the attitude is performed by calculating the position of the spot image on the light-receiving surface of the image sensor. At subsequent step T10, information concerning the on-and-off state of the second contact as well as the extracted attitude information is transmitted to the display machine side.

After one cycle of the processes from step T4 to step T10, the transmission routine returns to step T3. When the first contact is turned off after this routine has been repeated every sample timing, the procedure branches off from step T3 to step T11 to transmit a menu termination command. After that, the operation returns to the waiting state.

Figure 4:
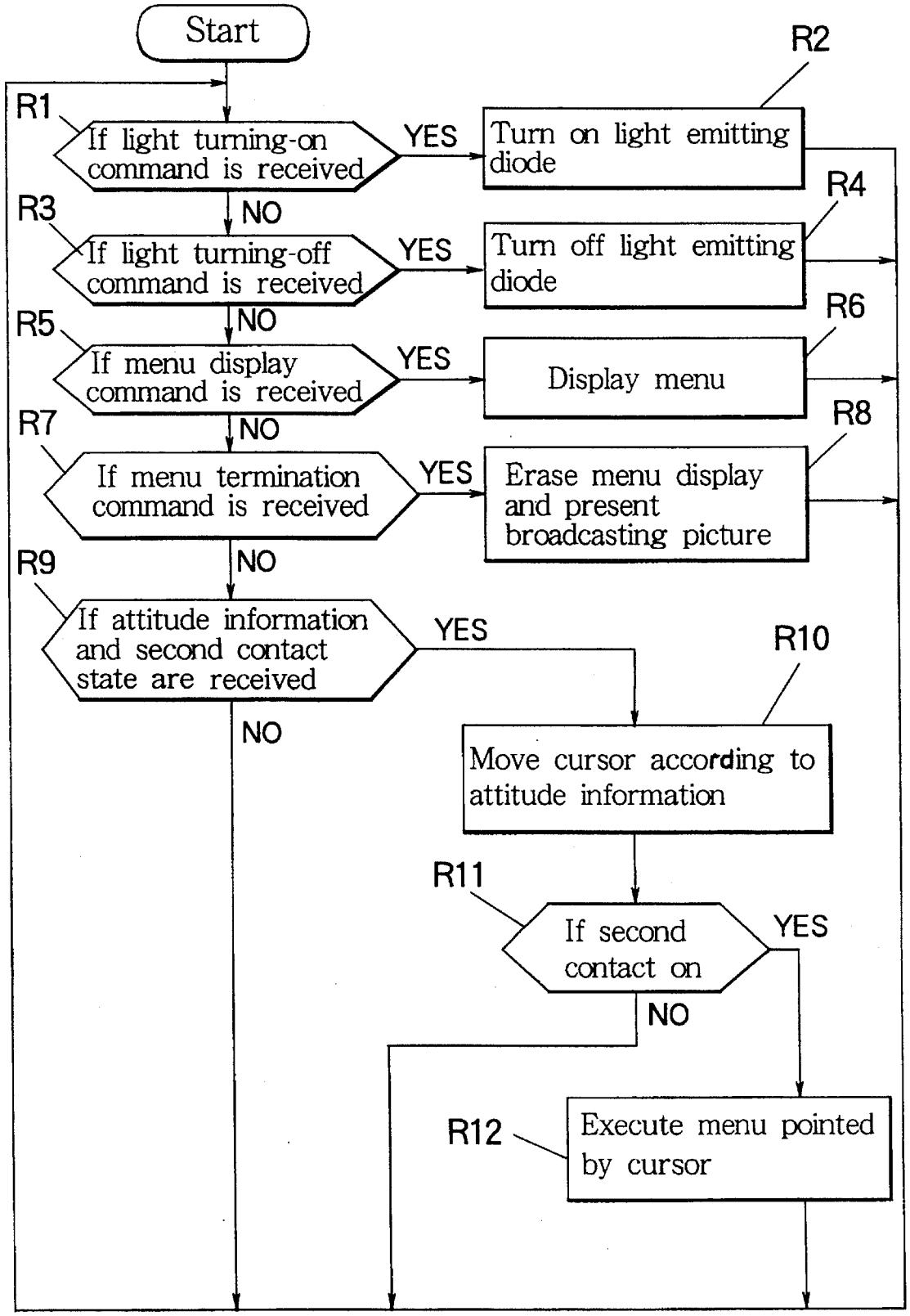
FIG. 4 is a flow chart illustrating an operation of the television receptor.

Lastly, referring to a flow chart of FIG. 4, the processings of the television receptor 1 will be described in detail. After start of a series of processings, it is first determined whether the light turning-on command has been received at step R1. If the result of determination is positive, the light emitting diode 6 is turned on at step R2. Next, at step R3, it is determined whether the light turning-off command has been received, and if positive, the light emitting diode 6 is turned off at step R4.

Subsequently, it is determined whether the menu display command has been received at step R5, and if positive, then the menu 3 is indicated on the screen 2. Further, at step R7, it is determined whether the menu termination command has been received. If the result is positive, the display of the menu 3 is removed from the screen 2 at step R8 and a normal broadcasting image is presented thereon. At subsequent step R9, it is determined whether the attitude information and the on-and-off state of the second contact have been received, and if positive, the process goes to step R10 to move the cursor 4 according to the transmitted attitude information. The above routine from step R1 to R10 is repeated so that the pointing operation of the cursor 4 can be performed.

Next, the procedure goes to step R11 to determine whether the second contact has been turned on. If the result of the determination is positive, it goes to step R12 to perform the processing according to an item of the menu 3 that is pointed by the cursor 4. For example, when the second contact is turned on while the cursor 4 points an item "NHK 1" of the menu 3 on the screen 2, then the channel NHK 1 is selected.

The pointing operation of the cursor 4 described above is not limited to the selection of the menu 3 and, for example, a desired level of sound volume can be input and designated by moving the cursor 4 along the sound volume bar 5.

As described above, according to the present invention, pointing information or analog amount information can be input to the machine side by changing the attitude (direction) of the input implement by hand. This operation does not require a working desk as opposed to a mouse implement, and the information can be input only by slightly shaking the input implement with holding it in operator's hand, thus effectively improving its workability in a wide range. Also, by detecting the attitude of the input implement, the pointing information can be input with high accuracy by less manual movement.

Furthermore, according to the present invention, when the pointing information is transmitted to the machine side, since the modulated infrared-light is used as the medium, the transmission can be carried out by wireless, i.e., a wireless input implement can be used therefor, and this makes it possible to perform a comfortable operation.

In addition, since the image data are read out from the image sensor in synchronism with the on-and-off operation of the light source to extract the attitude of the input implement based on the difference between the on and off image data, the influence of the disturbed light can be removed, thus effectively enlarging a range of an effective distance between the machine body and the input implement. At this time, the on-and-off operation of the light source can be remotely controlled by using the modulated infrared-light to achieve the wireless transmission of the input information.

What is claimed is:

1. An information input system comprising the combination of an input implement which may be manually operated relative to a predetermined reference point to change the attitude thereof, and a detector for optically detecting the attitude of the input implement so that information according to the manual operation may be input to a machine based on a result of the attitude detection, the system comprising: a manually operable input implement; at least one light source arranged at a predetermined reference point for emitting an incident ray of light toward the input implement; and a detector comprising image formation means, light-receiving means, and processing means, each of which is disposed in the input implement so as to receive the incident ray of light emitted from the light source; wherein the image formation means includes means for converting the incident ray of light emitted from the light source into one of a spot image and a pattern image to be projected on the light-receiving means, the light-receiving means includes means for outputting an electric signal according to a position of the spot image or the pattern image corresponding to the attitude of the input implement, and the processing means includes means for processing the electric signal to extract the attitude of the input implement and for transmitting the extracted attitude to the machine as input information, and wherein the input implement further comprises means for controlling the on-and-off operation of the light source arranged at the reference point, and the processing means includes means for reading out the electric signal from the light-receiving means in synchronism with the on-and-off operation of the light source and for extracting the attitude of input implement based on a difference between sequentially read-out electric signals, such that influence of disturbing light is eliminated.

2. An information input system according to claim 1; wherein the input implement comprises a wireless input implement provided with a transmitter for transmitting an infrared ray of light which is modulated based on the extracted attitude of the input implement and which is directed toward the machine so that the wireless transmission of the input information is carried out.

3. An information input device comprising: a machine having a light source for emitting a light in response to a control signal; and an input implement comprising transmitting means for transmitting data to the machine, image forming means for receiving light emitted by the light source and forming an image in accordance with the received light, light receiving means for receiving the image and outputting a corresponding electrical signal, processing means for reading the electrical signal and determining therefrom the attitude of the input implement with respect to a predetermined reference point, and control means for controlling the transmitting means to transmit a control signal to activate the light source to emit light synchronously with the reading of electrical signals from the light receiving means to avoid the effect of external light.

4. An information input device according to claim 3; wherein the input implement is a wireless remote control device.

5. An information input device according to claim 3; wherein the image forming means includes means for converting the received light into a spot image.

6. An information input device according to claim 3; wherein the image forming means includes means for converting the received light into a pattern image.

7. An information input device according to claim 3; wherein the image forming means comprises a lens.

8. An information input device according to claim 3; wherein the transmitting means comprises means for transmitting data in the form of modulated light.

9. An information input device according to claim 8; wherein the machine further comprises means for receiving and processing data transmitted by the input implement.

10. An information input device according to claim 3; wherein the control means comprises a microcomputer for controlling the on/off operation of the light source synchronously with the reading of signals from the light receiving means.

11. An information input device according to claim 3; wherein the input implement further comprises a manually operated two-stage switch connected to the control means and the processing means, the control means includes means responsive to operation of the two-stage switch for controlling the light source to emit light when the switch is activated, and the processing means includes means responsive to operation of the switch to read the electrical signal output by the light receiving means when the switch is activated and deactivated, such that activation and deactivation of the light source is conducted synchronously with reading of the electrical signal to thereby avoid the influence of external light.

* * * * *